Figure 1:
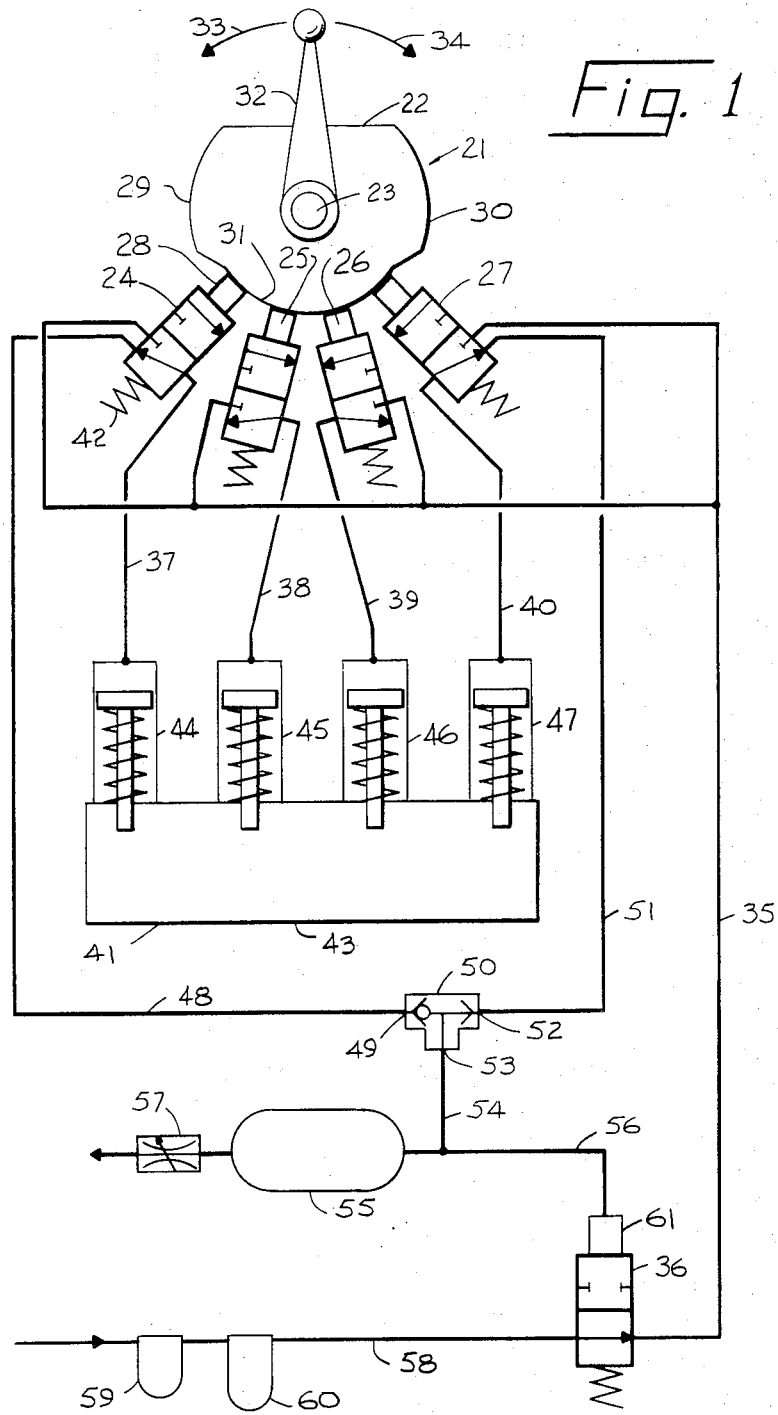

United States Patent [19]
Kobelt

[11] 3,820,438
[45] June 28, 1974

[54] NEUTRAL TIME-DELAY FLUID CONTROL CIRCUIT

[76] Inventor: Jack R. Kobelt, 235 E. 5th Ave., Vancouver, Canada

[22] Filed: Mar. 22, 1973

[21] Appl. No.: 343,738

[52] U.S. Cl.............. 91/36, 91/413, 60/413, 137/636.1
[51] Int. Cl.............. F15b 21/02, F15b 11/00
[58] Field of Search...... 91/35, 36, 413; 137/636.1, 137/636; 60/413

[56] References Cited
UNITED STATES PATENTS

| | | | |
|---|---|---|---|
| 2,725,890 | 12/1955 | Kanuch | 91/413 |
| 2,782,802 | 2/1957 | Sassen | 91/413 |
| 3,015,344 | 1/1962 | Hansmann et al. | 91/413 |
| 3,099,289 | 7/1963 | Neilson et al. | 91/413 |

*Primary Examiner*—Edgar W. Geoghegan
*Assistant Examiner*—A. M. Zupcic

[57] ABSTRACT

This disclosure pertains to a novel fluid control circuit which provides a neutral time-delay between two modes of operation, such as between forward and reverse in a power transmission system. A control head, having a duality of operational modes, sequentially actuates one or more fluid control valves in either mode. The exhaust port of the first actuated control valve in each mode is duct interconnected by means of a shuttle-valve to a volumetric fluid accumulator, and to the pilot portion of a pilot operated two-position two-way control valve which controls the fluid supply to the fluid control valves in the control head. The accumlator has a variable flow-control exhausting valve whereby a sudden change from one to the other of the operational modes of the control head closes and maintains closed the pilot operated control valve, for an adjustable neutral time-delay period, until the fluid in the accumulator is exhausted.

11 Claims, 1 Drawing Figure

NEUTRAL TIME-DELAY FLUID CONTROL CIRCUIT

This invention relates to novel structure in devices and combinations thereof which are known in the art to which they pertain as fluid control devices, fluid control circuits, fluid control systems, or are of the general character of fluid power systems which either transmit or control power through the use of a pressurized fluid within an enclosed circuit. In general, my invention relates to a fluid control circuit which provides a neutral time-delay in a dual mode fluid control system when control is passed through a neutral mode from one control mode to the other control mode. Specifically, my invention may be used to control a geared transmission, in combination with a prime mover, where forward and reverse operating modes are separated by a neutral mode and a neutral pause is required to allow engine speed or fuel settings to be adjusted. Still more particularly, in a marine propeller shaft application driven in one direction by a prime mover through a geared transmission, it may be necessary to permit auxiliary clutches or brakes to stop the shaft before rotation in the opposite direction is commenced. Another application for my invention would be in cable winding devices, such as that found in logging and excavating machinery, where the winding-in and paying-out functions are separated by a holding function; a neutral time-delay in such machinery permits stabilization of the cable system prior to commencement of motion. It should be noted in such devices as those above described where my invention is likely to find application are those where it is often necessary to protect expensive plant or equipment having two operating modes of operation, such as forward and reverse separated by a neutral mode, from unwanted sudden shifts from one operating mode to the other, despite the possibility of inexperienced, accidental or careless control. In addition, it is often desirable in such machinery to preset a predetermined desirable neutral time delay which will be consistent over varying conditions of operation.

In its simplest form, my invention employs a valve control head which has two modes of control separated by a neutral mode or position. The control head actuates one or more valves in each control mode and may itself be actuated either manually or remotely by electrical, pneumatic, hydraulic, or mechanical means. The valves actuated by the control head receive fluid through a pilot operated valve from a pressurized fluid source. The outlets of the control valves are connected operatively to a controlled device such as a geared transmission, a prime mover, a set of clutches, a hydraulic servo-mechanism, or other such controlled elements, or combinations thereof, in many kinds of powered machinery. The exhaust port of the first sequentially actuated valve in each control mode is duct connected through a shuttle-valve to a fluid accumulator having a flow-control valve exhaust. The pilot portion of the pilot operated valve is duct connected to the accumulator. Therefore, no matter how fast the control head is shifted through neutral from one operating mode to the other, a neutral time-delay will be imposed on the control system; the length of time-delay will be determined by the time it takes to exhaust the control fluid from the accumulator.

Accordingly, it is an object of this invention to provide a simplified combination of fluid control devices so interconnected as to provide a neutral time-delay between two operating modes of a control system.

Another object of my invention is to provide a simplified neutral time-delay fluid control circuit which can be used in combination with all kinds of prime movers, geared transmissions, clutches, and remotely controlled servo-mechanisms.

Still another object of my invention is to provide a simplified neutral time-delay fluid control circuit which may be employed to protect heavy dual mode machinery from careless, inexperienced, accidental, or incorrect operation.

Yet another object of my invention is to provide a simplified neutral time-delay fluid control circuit which employs a plurality of control valves in at least one of two operating modes.

Another object of my invention is to provide a simplified neutral time-delay fluid control circuit for dual operating mode automated machinery where a consistent time-delay is required to separate the operating modes.

These and further objects of my invention, which reside in the details of its structure and operation, will be evident from a study of the following disclosure and accompanying drawings which illustrate a preferred embodiment of the invention. This embodiment is merely exemplary and is not intended to detract from the full scope of the invention as set out in the annexed claims.

In the drawing, wherein like numerals refer to like parts:

FIG. 1 is a schematic diagram of my invention employing fluid control device symbols which are readily understood to one skilled in the art.

Turning now to FIG. 1, my invention is illustrated wherein a valve control head, generally denoted by the numeral 21, comprises a cam portion 22 pivotally mounted on a frame, console, or other such structure (not shown) by shaft 23. Fluid control valves 24, 25, 26 and 27 are operatively connected to cam 22 by typical spool rod 28 and return spring 42. Cam 22 is recessed whereby contour 29 actuates valves 24 and 25, contour 30 actuates valves 26 and 27, and contour 31 actuates none of the fluid control valves, thereby providing a neutral mode or position of cam 22.

Handle 32 represents a manual means whereby cam 22 may be pivoted in either direction 33 or 34. It will be evident to one skilled in this art that remotely controlled mechanical, electrical, or fluid powered devices readily may be employed for this purpose. Moreover, whereas a single cam is illustrated as actuating all of valves 24, 25, 26 and 27, it will be evident that several cams mounted on a single shaft 23, linear cam means, and pivoted cam means mounted on separate shafts may be employed to actuate a plurality of fluid control valves.

Handle 32 represents, in its substantially upright position as illustrated, a neutral mode or neutral position. Pivoting of cam 22 in direction 33, thus actuating valves 24 and 25 represents a first valve actuating mode of operation of control head 21; pivoting of cam 22 in direction 34, thus actuating valves 26 and 27 represents a second valve actuating mode of operation of control head 21.

Fluid control valves 24, 25, 26, and 27 are conventionally called three-way two-position valves. The inlet ports of these valves are duct connected by duct 35 to the outlet port of two-way two-position pilot operated valve 36. The outlet ports of these valves are duct connected by means of ducts 37, 38, 39 and 40 to a fluid controlled device generally denoted by the numeral 41. In the neutral position as shown, valves 24, 25 26, and 27 are closed to flow from valve 36 and open to exhaust fluid from device 41; in an actuated position each of valves 24, 25, 26, and 27 will be closed to exhaust outlet and open to flow from valve 36 to device 41.

Device 41 is exemplary only and is illustrated schematically to comprise frame 43 and spring-return linear actuators 44, 45, 46, and 47; it will be clear to one skilled in this art that device 41 may be a gear transmission, set of clutches, or other such fluid controlled power transmission machinery employing two modes of operation, such as forward and reverse, separated by a neutral mode. The essential feature of my invention is that a plurality of fluid devices, such as linear actuators 44, 45, 46, and 47, are controlled by the actuation of valves 24, 25, 26 and 27, subject to a neutral time-delay.

Fluid control valve 24 is the first of valves 24 and 25 to be actuated when cam 22 is pivoted in direction 33. Conversely, valve 27 is the first of valves 26, and 27 to be actuated when cam 22 is pivoted in direction 34. The exhaust port of valve 24 is connected by duct 48 to inlet port 49 of shuttle valve 50 and the exhaust port of valve 27 is connected by duct 51 to inlet port 52 of shuttle valve 50. Shuttle valve 50 is often referred to as a double check valve with cross bleed for reversible flow.

Outlet 53 of shuttle valve 50 is connected by duct 54 to volumetric fluid accumulator 55. Accumulator 55 is required to dump the fluid from device 41 when either of valves 24 or 27 are closed. Accumulator 55 is connected by duct 56 to the pilot portion 61 of valve 36 and time-dependently exhausted through adjustable flow-control valve 57.

A pressurized fluid source (not shown) is connected to the inlet port of valve 36 by duct 58. In the case of a conventional pneumatic pressurized fluid source, filter 59 and lubricator 60 are incorporated into duct 58.

Operation of my invention may now be considered with reference to the foregoing description of its structure. Consider first that handle 32 is in a position substantially as shown in FIG. 1. Pressurized fluid is contained in duct 58 and, presuming there having passed sufficient time to exhaust any previous contents of accumulator 55, valve 36 is open as shown. Hence, there is pressurized fluid in duct 35 and all of valves 24, 25, 26, and 27 are closed.

Consider now that handle 32 is moved in direction 34. Valve 27 is actuated into a position open to duct 35, duct 51 is closed, and linear actuator 47 of device 41 is actuated. If motion of handle 32 in direction 34 is continued, valve 26 is actuated in a manner identical to that just described for valve 27.

If now handle 32 is suddenly shifted through its neutral position, whereby to actuate both valves 24 and 25, valves 26 and 27 are first closed. Upon closing valve 27, the exhaust fluid from linear actuator 47 is transmitted through duct 51 and shuttle valve 50 to accumulator 55 and pilot portion 61. Valve 36 closes, thereby preventing fluid flow from duct 58 to valves 24 and 25 until the fluid in accumulator 55 is exhausted through valve 57 and valve 36 is allowed once again to open. The time taken to exhaust the fluid from accumulator provides the neutral time-delay of my invention and is variable by means of adjustable flow control valve 57.

Conversely, it can be shown readily that a shift through neutral in direction 34 will result in an identical time-delay, provided that the fluid volumes from linear actuators 44 and 47 are substantially the same. In the event that these volumes are not identical and identical neutral time-delays are required, or if they are identical and different neutral time delays are required, then a volumetric fluid accumulator 55 must be duct connected to each of ducts 48 and 51; each such accumulator should have its own flow control valve 57 for independent setting. In this case, outlet port 53 of shuttle-valve 50 is ducted only to pilot portion 61 of valve 36.

In the special case where a neutral time delay is required in only one direction of shift of handle 32, say in direction 33, then the exhaust port of valve 27 would be duct connected to accumulator 55. The exhaust port of valve 24 would be open to unrestricted flow and shuttle-valve 50 would not be required.

It is believed that my invention of a neutral time-delay fluid control circuit will have been clearly understood from the foregoing detailed description of my now preferred and illustrated embodiment. Various modifications, changes, additions, and equivalents may be resorted to in view of these teachings by one skilled in this art without departing from the spirit of my invention. Therefore, whereas a choice between such variations, modifications, changes, additions, and equivalents falling within the true scope of my invention will depend largely upon the circumstances in which my invention is used, it is my express intention that no limitations be implied and that the hereto annexed Claims be given the broadest interpretation to which the language fairly admits.

The embodiments of the invention in which an exclusive property or privilege is claimed are defined as follows:

1. A neutral time-delay fluid control circuit comprising a pressurized fluid source, a valve control head having two valve actuating modes of operation separated by a neutral position, a fluid control valve actuated in each of said two actuating modes of operation, a controlled device having inlet ports operatively connected to the outlet ports of each of said fluid control valves, volumetric fluid accumulating means operatively connected to the exhaust port of at least one of said fluid control valves, an exhausting flow-control valve means connected to said accumulating means, a pilot-operated two-position two-way fluid control valve having its pilot portion connected to said accumulating means and its inlet port connected to said fluid source and its outlet port connected to the inlet port of each of said fluid control valves, whereby a shift through said neutral position from one to the other of said two valve actuating modes causes the exhaust fluid from one of said fluid control valves to delay flow from said fluid source to the other of said fluid control valves.

2. A neutral time-delay fluid control circuit as defined in claim 1, wherein said exhausting flow-control valve means is adjustable, the time-delay during which exhaust fluid from one of said fluid control valves prevents flow from said fluid source to the other of said fluid control valves thereby being variable and adjustable.

3. A neutral time-delay fluid control circuit as defined in claim 1, further comprising a shuttle-valve having one of its inlet ports connected to the exhaust port of each of said fluid control valves, said volumetric fluid accumulating means connected to the outlet port of said shuttle-valve.

4. A neutral time-delay fluid control circuit as defined in claim 1, wherein said controlled device includes a geared power transmission apparatus having forward and reverse modes of operation.

5. A neutral time-delay fluid control circuit as defined in claim 1, wherein said controlled device includes a clutch in a power transmission apparatus having forward and reverse modes of operation.

6. A neutral time-delay fluid control circuit as defined in claim 1, wherein said controlled device includes a clutch in a cable-winding device having in-haul and pay-out modes of operation.

7. A neutral time-delay fluid control circuit as defined in claim 1, wherein said fluid control valve in at least one of said two actuating modes of operation is a three-way two-position fluid control valve.

8. A neutral time-delay fluid control circuit as defined in claim 1, wherein said fluid control valve the exhaust port of which is connected to said accumulating means is the first actuated of a plurality of fluid control valves in one actuating mode of operation of said valve control head.

9. A neutral time-delay fluid control circuit as defined in claim 1, wherein said fluid control valve in each of said two actuating modes of operation is the first actuated of a plurality of fluid control valves in each of said two actuating modes of operation.

10. A neutral time-delay fluid control circuit comprising a pressurized fluid source, a valve control head having two valve actuating modes of operation separated by a neutral position, a plurality of sequentially actuated fluid control valves in each of said two actuating modes of operation, a controlled device having inlet ports operatively connected to the outlet ports of each of said fluid control valves, a shuttle-valve having one of its inlet ports connected to the exhaust port of the first actuated of said plurality of fluid control valves in each of said actuating modes of operation, volumetric fluid accumulating means connected to the outlet port of said shuttle-valve, an exhausting flow-control valve means connected to said accumulating means, a pilot-operated two-position two-way fluid control valve having its pilot portion connected to said accumulating means and its inlet port connected to said fluid source and its outlet port connected to the inlet port of each of said fluid control valves, whereby a shift through said neutral position from one to the other of said two valve actuating modes causes the exhaust fluid from the first actuated of one plurality of said fluid control valves to delay flow from said fluid source to the other plurality of said fluid control valves.

11. A neutral time-delay fluid control circuit comprising a pressurized fluid source, a valve control head having two valve actuating modes of operation separated by a neutral position, a fluid control valve actuated in each of said two actuating modes of operation, a controlled device having inlet ports operatively connected to the outlet ports of each of said fluid control valves, a pair of volumetric fluid accumulating means, one of said volumetric fluid accumulating means operatively connected to the exhaust port of each of said fluid control valves, an exhausting flow-control valve means connected to each of said pair of volumetric fluid accumulating means, a shuttle-valve having one of its inlet ports connected to each of said volumetric fluid accumulating means, a pilot-operated two-position two-way fluid control valve having its pilot portion connected to the outlet port of said shuttle-valve and its inlet port connected to said fluid source and its outlet port connected to the inlet port of each of said fluid control valves, whereby a shift through said neutral position to each of said valve actuating modes causes the exhaust fluid from one of said fluid control valves to delay flow from said fluid source to the other of said fluid control valves.

* * * * *